Sept. 14, 1948. J. B. CASTLE 2,449,160
VEHICLE-MOUNTED FRONT END LOADER
Filed April 2, 1946
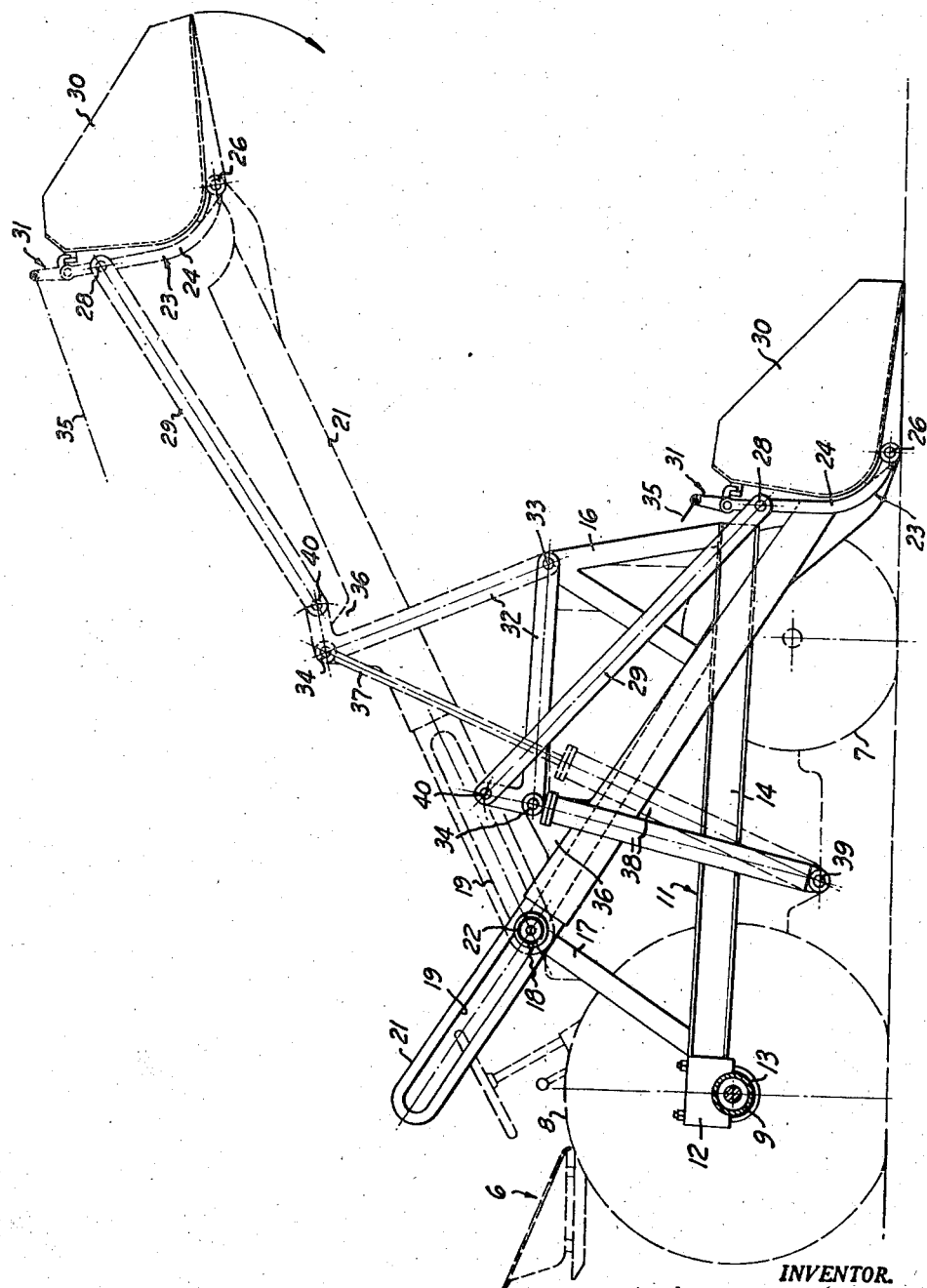
INVENTOR.
James B. Castle
BY
Robert N. Eckhoff
Attorney Patented Sept. 14, 1948

2,449,160

UNITED STATES PATENT OFFICE 2,449,160

VEHICLE MOUNTED FRONT END LOADER

James B. Castle, Oakland, Calif., assignor to Reconstruction Finance Corporation, San Francisco, Calif., a corporation of the United States Application April 2, 1946, Serial No. 658,907

3 Claims. (Cl. 214—141)

This invention relates to improvements in front-end loaders for a dirigible vehicle.

As is known in the art, front-end loading devices are mounted upon a dirigible vehicle, such as are provided by wheel or track laying tractor devices. Such a loader usually includes a bucket supported on the vehicle by a lifting mechanism so that the bucket can be elevated from ground level to a suitable position and then released to discharge its load into a truck. In place of a bucket, the loader can include a rake, tray, or similar device; for convenience, the term bucket is used herein as including these and other devices usually employed in a loader of this type.

For lifting the bucket, two types of mechanism have generally been employed, (1) a vertical lift mechanism which raises the bucket vertically to an elevated position directly over the position which it occupied at ground level or (2) a pair of arms mounted adjacent each side of the vehicle for movement over an arc to raise the bucket to a desired elevation above ground level. In either case, the final raised position of the bucket was substantially over the front end of the vehicle. When it was desired to discharge material, the vehicle, of necessity, had to be moved forward to the point of discharge. In loading earth into a truck, for example, the material could only be dumped adjacent the end or a side of the truck instead of adjacent the center of the truck. For this reason, the truck could not be loaded fully or as readily. Other obvious disadvantages are inherent in these prior art mechanisms.

In accordance with this invention, I provide a bucket support mechanism positioning the bucket directly in front of the vehicle while it is in the scraping and loading position and which, upon elevation of the bucket, moves the bucket forwardly and considerably in advance of the front of the vehicle. In this way, I am able to discharge the material in an elevated position and, without moving the vehicle, at a point in advance of the vehicle. Earth carried in the bucket, can, therefore, be discharged in a truck adjacent the central portion of the truck or, if a fork or tray be substituted for the bucket, boxes and stacks of material can be discharged at a point elevated and in advance of the front end of the vehicle.

It is in general the broad object of the present invention to provide an improved front-end loader for mounting upon a dirigible vehicle.

A further object of the present invention is to provide an improved front-end loader construction.

The invention includes other objects and features of advantage, some of which, together with the foregoing, will appear hereinafter when the present preferred form of front-end loader of this invention is disclosed.

Referring to the drawing accompanying and forming a part hereof, the single figure is a side elevation showing the front-end loader of this invention mounted upon a dirigible vehicle of the wheel tractor type.

Referring to the drawing, I have indicated a suitable dirigible vehicle by numeral 6, the vehicle having steerably mounted front wheels 7 and rear wheels 8 mounted upon a suitable axle or drive shaft structure 9. While the vehicle illustrated is of the wheel type, it is obvious that one can use any other type of dirigible vehicle desired such as a track-laying type tractor or a combination of the wheel and track type, the invention not being limited in this respect nor limited to a dirigible vehicle if steering is not essential.

The loader includes a U-shaped frame generally indicated by numeral 11 supported at each end by a suitably recessed block 12 secured by a U-bolt 13 on each end of frame 11. The U-shaped frame 11 includes a frame member 14 extending along each side of the vehicle fore and aft of the vehicle. The two side frame members 14 are joined together by a suitable transverse member extending across the front of the vehicle (not shown) and suitably supported (by means not shown) at the front end of the vehicle. At the forward end of each frame member 14 is mounted a support frame 16 while adjacent the rear end of each frame member 14 is fixedly mounted an arm 17 extending upwardly and forwardly to provide a support for a roller 18 which rides in slot 19 in each of two bucket support arms 21. Washers 22 are secured over each roller to retain the rollers in place.

At the forward end of each of the two bucket support arms 21 is provided a bucket support frame 23 including a member 24 hinged at 26 upon each support arm 21 and extending upwardly for hinged engagement at 28 with one end of a lever 29. A suitable latch mechanism indicated generally at 31 and mounted on the bucket support frame 23 supports bucket 30 in scraping and load retaining position, as is shown in full lines in the drawing. A suitable rope, cable or rod 35 is attached to the latch; upon release of the latch, the bucket is free to swing about its hinge support 26 and dump its load.

The other end of each lever 29 is hinged as at 40 upon one end of a bell crank 32. The other end of each bell crank 32 is hinged at 33 upon each frame 16, there being two levers 29 and two bell cranks 32. Each bell crank 32 is hinged intermediate its end on a pin 34 mounted in an ear 36 provided upon each support arm 21. Also secured to each pin 34 is a piston rod 37 extending into a cylinder 38, the rod having a suitable piston (not shown) in the cylinder. The end of each cylinder 38 is supported on a suitable hinge support 39 which is either provided directly by frame 11 or upon a depending frame portion of the dirigible vehicle 6.

In operation, the normal loading position of the bucket is as appears in full line in the drawing. In this position the bucket is in close to the front end of the vehicle and receives adequate support therefrom. Because the bucket is so close to the vehicle, no undue stress is placed upon any of the support mechanism and the vehicle with the bucket attached can be easily manipulated to scrape and load. When it is necessary to raise the bucket, a suitable hydraulic fluid is supplied to each of cylinders 38 under the control of a suitable valve from a source of fluid under pressure associated with the vehicle. Admission of the fluid forces each piston rod 37 upwardly whereby the bell cranks 32 are rocked about their pivotal support 33 on frames 16 and levers 29 are moved upwardly. At the same time, the bucket support arms 21 are moved upwardly and forwardly about the hinged sliding support provided for the support arms by roller 18 on each of arms 17. In this manner, instead of merely rocking the arms about the ends of arms 17, the bucket support arms are moved upwardly and forwardly so that the final position of the bucket is as appears in dotted lines in the drawing in advance of that position which the bucket would assume if it were merely swung upwardly from in front of the vehicle. In this position, the bucket can be discharged upon releasing the latch, in advance of the vehicle. When the fluid is released from the cylinders, of course, the bucket moves downwardly and rearwardly to the full line position shown in the drawing.

I claim:

1. A front end loader for a vehicle comprising a frame mounted on said vehicle and including a frame member extending fore and aft along each side of said vehicle, a support frame at the forward end of each frame member, an arm extending upwardly at the rear end of each frame member, a bucket, a bucket support frame, a pair of bucket support arms carrying said bucket support frame at one end, each of said support arms being slidably supported by one of said arms, and means for raising and lowering said bucket support arms comprising a pair of cylinders each supported from said vehicle and having a piston therein on a piston rod, a pair of bell cranks each hinged at one end on one of said support frames, a pair of levers each connected at one end to one of said bell cranks and at its other end to said bucket support frame, and means hingedly connecting a piston rod to an intermediate point on a bucket support arm and to an intermediate point on a bell crank whereby upward movement of said piston rod is effective to lift said bucket support arms upwardly and move them forwardly on the slidable support provided for said bucket support arms by said arms.

2. A front end loader for a vehicle, comprising a frame mounted on said vehicle and including a frame member extending fore and aft along each side of said vehicle, a support frame at the forward end of each frame member, an arm extending upwardly at the rear end of each frame member, a roller on each of said arms, a bucket, a bucket support frame, a pair of bucket support arms carrying said bucket support frame at one end, and having a slot at the other end thereof, each of said bucket support arms being slidably supported by a roller on said arm mounted in said slot, and means for raising and lowering said bucket support arms comprising a pair of cylinders each supported by one of said frame members and having a piston therein on a piston rod, a pair of bell cranks each hinged at one end on one of said support frames, a pair of levers each connected at one end to one of said bell cranks and at its other end to said bucket support frame, and means hingedly connecting a piston rod to an intermediate point on a bucket support arm and to an intermediate point on a bell crank whereby upward movement of said piston rod is effective to lift said bucket support arms and move them forwardly on the slidable support provided for said bucket support arms by said rollers on said arms sliding in said slots.

3. A front end loader for a vehicle comprising a frame mounted on said vehicle and including a frame member extending fore and aft along each side of said vehicle, a support frame at the forward end of each frame member, a bucket, a bucket support frame, a pair of bucket support arms carrying said bucket support frame at one end, each of said support arms being slidably supported by one of said arms, and means for raising and lowering said bucket support arms comprising a pair of cylinders each supported from said vehicle and having a piston therein on a piston rod, a pair of bell cranks each hinged at one end on one of said support frames, and a pair of levers each connected at one end to one of said bell cranks and at its other end to said bucket support frame, said piston rods and intermediate points on said bell cranks being hingedly connected to said bucket support arms whereby upward movement of said piston rods is effective to lift said bucket support arms upwardly and move them forwardly on the slidable support provided for said bucket support arms by said arms.

JAMES B. CASTLE.

REFERENCES CITED

The following references are of record in the file of this patent:

UNITED STATES PATENTS

| Number | Name | Date |
| --- | --- | --- |
| 1,504,427 | Butler | Aug. 12, 1924 |
| 2,287,375 | Ford | June 23, 1942 |
| 2,273,970 | Lindgren | Feb. 24, 1942 |
| 2,306,313 | Johnson | Dec. 22, 1942 |
| 2,310,284 | Gurries | Feb. 9, 1943 |
| 2,328,715 | Drott | Sept. 7, 1943 |
| 2,332,742 | Mott | Oct. 26, 1943 |
| 2,347,455 | Beckwith | Apr. 25, 1944 |
| 2,379,523 | Henry | July 3, 1945 |
| 2,389,029 | Crabtree | Nov. 13, 1945 |
| 2,396,107 | Lessmann | Mar. 5, 1946 |
| 2,426,544 | Wooldridge | Aug. 26, 1947 |